Sept. 20, 1938.  J. L. KELLY  2,130,627
MACHINE FOR PREPARING TIRES FOR RETREADING
Filed June 14, 1937  5 Sheets-Sheet 1

INVENTOR.
John L. Kelly
BY
ATTORNEY.

Sept. 20, 1938.  J. L. KELLY  2,130,627
MACHINE FOR PREPARING TIRES FOR RETREADING
Filed June 14, 1937    5 Sheets-Sheet 4

INVENTOR.
John L. Kelly
BY
ATTORNEY.

Sept. 20, 1938.   J. L. KELLY   2,130,627
MACHINE FOR PREPARING TIRES FOR RETREADING
Filed June 14, 1937   5 Sheets-Sheet 5

INVENTOR.
John L. Kelly
BY
ATTORNEY.

Patented Sept. 20, 1938

2,130,627

UNITED STATES PATENT OFFICE 2,130,627

MACHINE FOR PREPARING TIRES FOR RETREADING

John L. Kelly, Los Angeles, Calif.

Application June 14, 1937, Serial No. 148,165

22 Claims. (Cl. 29—27)

This invention relates to and has for an object the provision of a machine which is selectively operable to cut away and treat substantially all or predetermined lesser circumferential portions of approximately the entire outer circumferential area of a tire between its beads, in preparation for the repairing or retreading thereof.

Another object is to provide a machine of the character described which may be manually selectively set for a predetermined treatment of the tire, such as the cutting away of the tread and either or both side walls to predetermined depths and which, after being thus set, will automatically and uniformly remove and treat the predetermined outer circumferential areas of the tire without further attention of the operator.

Another object is to provide a machine of the character described which may be quickly and accurately set for treatment of the tires of given sizes for removing the tread cap only or the entire tread only or the entire tread and either or both side walls, and may thereafter be operated entirely automatically to perform the selected operation and, at the same time, abrade the cut surface of the tire to prepare the tire for retreading or repair in one operation.

Yet another object is to provide a machine of the character described which will include an anvil around and in engagement with which the tire is rotated, and motor driven cutting and rasping tools which are moved transversely of and in engagement with the tire during the rotation of the latter, said tools being engaged with the tire at points opposite said anvil, together with a selective setting means for predetermining the extent of transverse movement of said tools and the points in their transverse movement at which the tools will be applied to and removed from the tire.

I have shown in the accompanying drawings a preferred form of a machine for preparing tires for retreading embodying my invention, subject, however, to modification, within the scope of the appended claims, without departing from the spirit of my invention.

In one embodiment of the invention, the machine generally comprises a frame A, a tire supporting anvil B, a combined tire holding and rotating means C for rotating the tire D around and while engaged with said anvil; a motor driven tire detreading cutter E for removing the tread and side wall portions of the tire; a motor driven rasp F for roughening the tire surface after the cut has been made; an oscillatory carriage G for moving said cutter and rasp transversely across the tire at points opposite the anvil, a tool applying means H for moving the cutter and rasp relative to the carriage into and out of operative contact with the tire; a drive means J for oscillating the carriage; a manually adjustable control means K, when set manually, will automatically effect predetermined transverse movements of the cutter and rasp relative to predetermined points of engagement thereof with the tire; and a templet means L selectively operable for determining the depth and contour of the surface removal cuts to be made in tires of different sizes and hydraulic means M for shifting the tire holder C for centering tires of different sizes.

More specifically, the control means K provides for setting the machine to detread and apply the rasp to the cap portion only of the tread, or the entire tread portion, or the tread portion and either or both side walls, and after being manually set for any of the operations, will cause the machine to effect the selected cut in one continuous operation without requiring further manual operation.

Anvil

Figures 4, 5, 6, 7, 8:
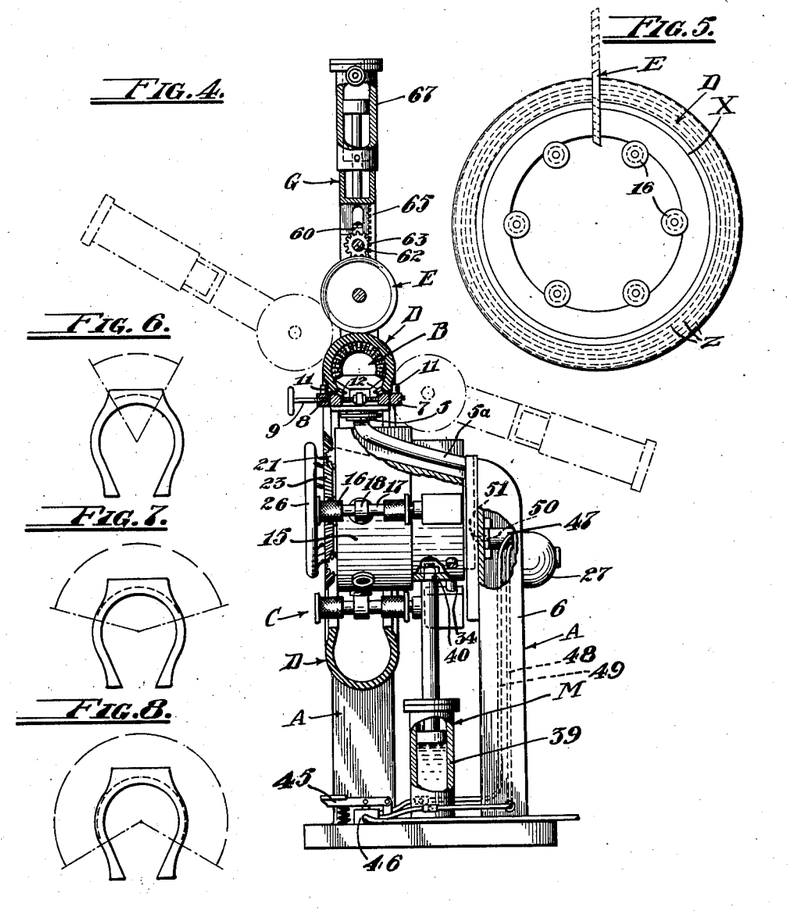
Fig. 4 is a vertical section with parts broken away and portions shown in side elevation for the sake of clarity of illustration.
Fig. 5 is a diagrammatic view showing a tire and the cutter and indicating the manner in which the tread is cut away during an operation of the machine.
Fig. 6 is a diagram showing the movement of the cutter necessary for removing the "cap" portion only of the tread.
Fig. 7 is a view similar to Fig. 6 showing the movement of the cutter and a depth of cut as when removing the entire tread portion.
Fig. 8 is a view similar to Figs. 6 and 7 showing the extent of the cut and movement of the cutter necessary to remove the tread and side walls.
Figures 13, 14, 15, 16:
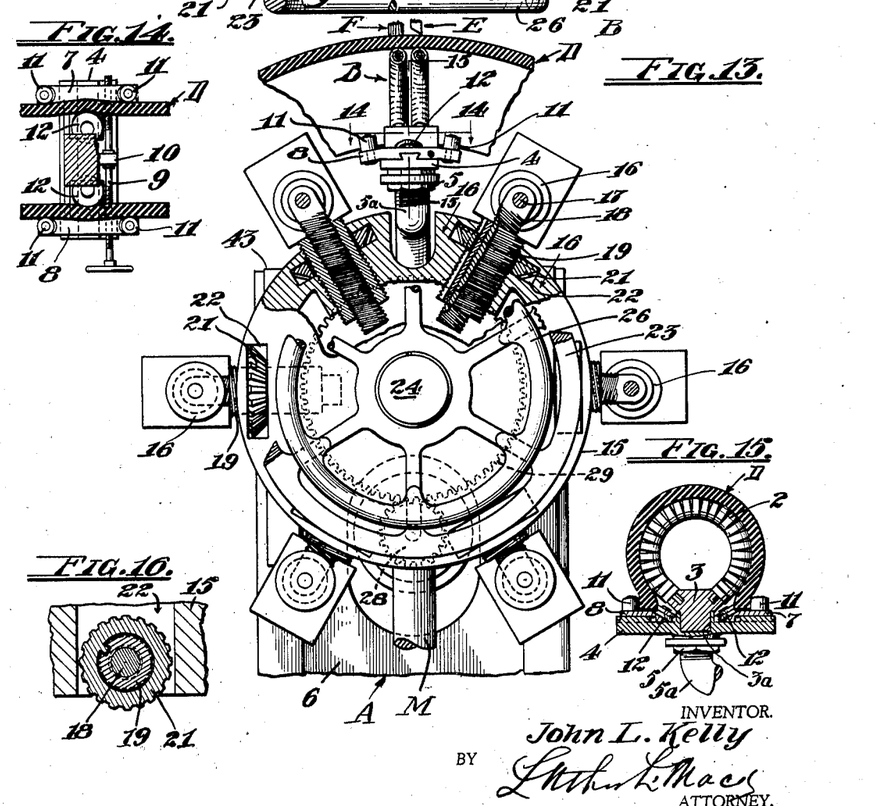
Fig. 13 is an enlarged fragmentary front elevation of the means shown in Fig. 12, with certain parts in section.
Fig. 14 is a detail section of the tire supporting anvil taken on the plane of line 14—14 of Fig. 13.
Fig. 15 is a section taken on the plane of line 15—15 of Fig. 13.
Fig. 16 is a section taken on the plane of line 16—16 of Fig. 13.

The anvil B is adapted to rotatably support the tire against the cutter and rasp and comprises arcuate members 2 shaped to correspond to the cross section of a tire and having antifriction rollers thereon. The rollers are adapted to engage the interior of the tire, as shown in Fig. 4, so that although the tire is free to rotate around the anvil, the latter will effectively support the portion of the tire engaged with the cutter and rasp. As here provided, the members 2 are fixed to a block 3 removably supported by a socket 3a on a base plate 4 carried by a nut 5 adjustable on an arm 5a extending upwardly from a post 6 of the frame A. Slidably anchored on the plate 4 are bars 7 and 8 which are adjustable towards and away from one another by a screw shaft 9 rotatably anchored, as at 10, on said plate and threadedly connected with said bars. On the ends of the bars are tire bead clamping rollers 11 whereas between and spaced inwardly of the rollers 11 are rollers 12 adapted to engage the inner sides of the tire beads, as shown in Fig. 14.

When a tire is to be set up in the machine, it is hung on the anvil members 2 so as to encompass them and the bead portions of the tire are fitted between the rollers 11 and 12, whereupon the screw shaft 9 is operated to move the bars 7 and 8 so that said rollers will hold the tire to close engagement with the anvil members, while permitting the tire to be freely rotated.

Tire holding and rotating means

Figure 12:
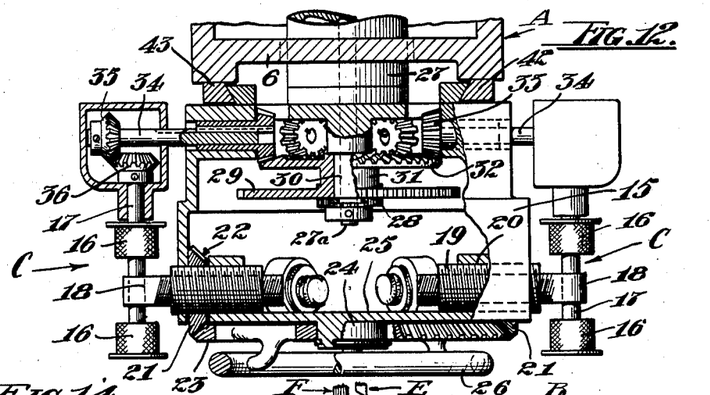
Fig. 12 is a fragmentary horizontal section of the tire holding and rotating means, with certain parts in top plan.

The means C comprises a hollow circular body 15 on which is mounted a circular series of tire driving rollers 16 which are radially movable into and out of contact with the bead portions of the tire for supporting and rotating the tire. These rollers 16 are fixed on shafts 17, which are supported by adjusting screws 18. The screws 18 are adjustably supported in internally and externally threaded sleeves 19 axially adjustable in threaded openings 20 in the body 15. Splined on these sleeves are beveled pinions 21 rotatably held in body recesses 22 and driven by a gear 23 rotatable on a stud 24 on the front wall 25 of said body. A hand wheel 26 provides for rotation of the gear 23 and when manipulated causes a relatively great and rapid movement of the screws 18, due to the greater lead of the threads thereon and the internal threads of the sleeves 19 compared to a shorter movement required of the sleeves in openings 20. Thus the holding and driving rollers 16 may be quickly moved to effect the setting up and removal of a tire.

The rollers 16 are driven by a motor 27 supported by the body 15 and having its shaft 27a provided with a drive pinion 28 which meshes with a larger gear 29 mounted on stud shaft 30 on said body. A hub 31 of the gear 29 carries a beveled gear 32 which meshes with pinions 33 carried by radial shafts 34 on the body 15. These shafts 34 drive the rollers 16 through pinions 35 and 36 fixed on the shafts 34 and 17 respectively. A circuit closer 37 controls the motor 27, which it will now be seen will rotate the tire at a constant predetermined speed around the anvil B, while the cutter E and rasp F, as indicated in Fig. 13, are engaged with and moved transversely of the tire in the path of said anvil.

Means for centering the tire holding and rotating apparatus

The means M comprises a hydraulic jack 39 mounted on the frame A and connected as at 40 with the body 15, which latter, it will be noted, is vertically adjustably secured on the post 6 by means of the slidably interlocked guides 42 and 43 on said post 6 and body, respectively. The jack is controlled by lifting and lowering treadle valves 44 and 45 to which pipes 46 lead from a source of hydraulic fluid under pressure, not shown. A hydraulic latch 47 is also controlled by said valves through the pipes 48 and 49 whereby the latch member 50 will move into locking engagement with a notched member 51 of the body to hold the latter in position of adjustment. Adjustment of the body 15 is effected to center the rollers 16 to tires of different sizes, it being noted that the motor 27 and roller drive means are moved with said body.

Detreading tools and oscillatory carriage therefor

As here shown the cutter E, which is circular and has a beveled cutting edge, is mounted on a horizontal shaft 53 in a bearing 54 on the carriage G, whereas the rasp F is circular and similarly mounted on a shaft 55 and, motors 56 and 57, respectively, operate said shafts. These tools are mounted so that their flat faces are in closely spaced relation at a point opposite the anvil B and midway of the sides of the carriage. The carriage G is of an inverted U shape with its free ends mounted to oscillate on horizontal axes 58 and 59 on the frame A. These axes are in a plane which passes through the center of the anvil B, or cross sectional axis of the tire, whereby the tools E and F will be moved in transverse paths concentric with the cross sectional curvature of the tire, as determined by said anvil, subject, however, to the influence of the templet means L. These motor driven tools E and F are movable as units into and out of operative position on shoes 60 slidably mounted in the slotted sides 61 of the carriage, said shoes carrying the shafts 53 and 55 and motors 56 and 57, and being joined by a shaft 62 extending therebetween. The shaft 62 has pinions 63 and 64 fixed thereon so as to mesh with rack bars 65 and 66 fixed on the sides 61 of the carriage, whereby said shoes will move in unison, and the tools E and F likewise.

As here shown, the means H for controlling the application of the tools E and F to the tire comprises a hydraulic jack 67 connected to one of the shoes 60 and fixed on the carriage G. This jack is controlled by an automatic valve 68 forming a part of the control means K and connected to the jack by pipes 69 and 70.

The means J for oscillating the carriage G comprises a variable speed reversible multiphase motor 71 fixed on the frame A and driving the axis 58 of the carriage through a variable speed transmission means 72 and a gear train 72a. The motor is controlled by an automatic variable speed and reversing switch 73, and also by an operating handle 74 for the transmission means 72, which latter is operable for changing the speed of the motor over a wire range at will.

*Automatic control means*

Figure 3:
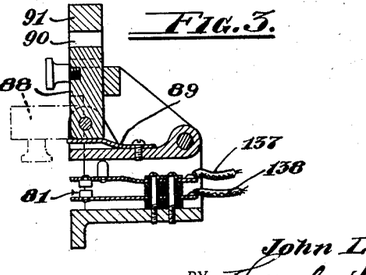
Fig. 3 is a section taken on the plane of line 3—3 of Fig. 1.

The switch 73 is arranged to reverse the main motor 71 and vary its speed and its operating duration through action of the means K, which latter comprises a series of normally open circuit control switches 75, 76, 77, 78, 79, 80 and 81 supported above the motor 73 and having hinged depressible actuators 82, 83, 84, 85, 86, 87 and 88, which are movable from position, shown in dotted lines in Fig. 3, to an upright position and maintained in upright position by springs 89. When in upright position, these actuators are subject to depression by a cam trip member 90, which is carried by a rack bar 91 driven by a worm and pinion drive means 93 from the axis 58 of the carriage G and supported in bearings 93. The movement of the rack bar and cam trip 90 is timed with that of the carriage so that the trip will engage and disengage and thereby depress and release the actuators 82 to 88, inclusive, and consequently close and open switches 75 to 81, inclusive, or certain of them, when the carriage is in predetermined positions, depending on the particular actuators set in "up" or operative position. When depressed, said actuators engage and close the circuit closers 75 to 81, inclusive, and when released, permit the circuit closers to spring into open position.

The circuit closers 75 to 81, inclusive, are employed to control the operation of solenoids 94 and 95 having a common armature 96, which latter is connected with a slotted crank arm 97 of the valve 68. These circuit closers also control a solenoid 98 which operates the automatic switch 73. It should be noted that switch 73 is also manually operable through the means 99. The switch 73 controls the main motor 71, also the motors 56 and 57 for the cutting tool and rasp, respectively. The solenoid 98 has a rack bar armature 100, which meshes with a ratchet drive means 101 for rotating the shaft 102 of the switch 73. A spring 103 restores the rack bar to operative position when the solenoid is deenergized. The switch 73 includes a housing 104 to which the solenoid is secured and wherein the shaft 102 is journalled. On this shaft are collector rings 105 electrically engaging contact elements 106, both in number necessary to control the three phase motor 71. A contact arm 107 is fixed to the shaft 102 for rotation therewith and has contacts 108, 109 and 110 insulated from one another thereon and adapted to engage sets 111, 112, 113 and 114 of fixed contacts on an annular insulation member within said housing. Conductors 115, 116 and 117 connect the contacts 106 with a source of three phase electric current not shown and are controlled by a main switch 118. The rings 105 are connected with the movable contacts 108, 109 and 110 by conductors 118, 119 and 120. A group of three conductors 121 connect the three contacts 111 with the high speed windings 122 of motor 71. Conductors 123, in a group of three, connect the three contacts 112 with the slow speed windings 124 of the motor 71, and the latter winding is arranged to cause the motor to rotate in a different direction than when the high speed winding is energized. A set of three conductors 125 connects the three contacts 113 with the conductors 121; and a set of conductors 126 connects the three contacts 114 with the slow speed winding 124. The latter set 126 of conductors is reversed compared to conductors 123 whereby to reverse the motor. Conductors 127 and 128 connect the cutter and rasp motors with conductors 123 and 126, which latter are employed to operate the slow speed winding of the motor 71 only when the cutter and rasp are applied to the tire, whereby the cutter and rasp will be rotated at such times only.

The circuit closer 78 is adapted to be closed when the machine is in starting position, as shown in Figs. 1, 18, 20 and 25. One side of this circuit closer is connected by a conductor 129 with the line conductor 116, whereas a conductor 130 leads from the other side of said circuit closer to the solenoid 94. This solenoid is connected in series with solenoid 98 by conductors 131 and 132, which latter leads to the line conductor 115.

Circuit closers 79 to 81, inclusive, are respectively connected by conductors 133—134, 135—136, and 137—138, with solenoid 95 and conductors 129, which latter is connected with line conductor 116. The solenoid 95 is also connected as at 139 with the conductor 131 and the circuit for said solenoid is completed through solenoid 98 and conductor 132 to the other line conductor 115. Circuit closers 77, 76 and 75, respectively, are connected by similar pairs of conductors 140—141, 142—143, and 144—145, with the solenoid 95 and conductor 129 in the same manner as circuit closers 79 to 81, inclusive.

The tire rotating motor 27 is connected through switch 37 by conductors 147, 148 and 149 with line conductors 115, 116 and 117.

*Template*

Figure 9:
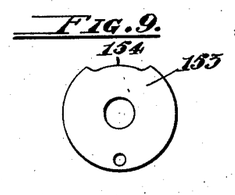
Figs. 9, 10 and 11 are side elevations of templates for determining the cuts shown in Figs. 6, 7 and 8, respectively.
Figure 10:
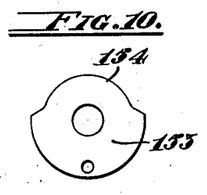
Figure 11:
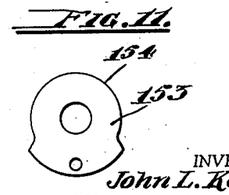

The template means L comprise a U-shaped frame 150 having supporting bars 151 and 152 for a series of templates 153. Certain of these templates are shown in Figs. 9 to 11 inclusive as of different shapes and formations to cut the head cap, tread, and tread and side walls, respectively. The group of the templates shown in Fig. 1 are of different sizes for tires of different sizes and are interchangeable with templates of different form, as, for example, those shown in Figs. 9, 10 and 11.

The bars 151 and 152 are withdrawable to provide for changing the templates. Each template has a curved surface 154 adapted to be engaged by a roller 155 on a carriage 156, which is laterally slidably supported on a rigid extension 156¹ of one of the shoes 60. The roller 155 is moved to position to contact the template desired and when engaged with a selected template will determine the depth and contour of the cut made in the tire inasmuch as the cutter and rasp will follow the curve and shape of the template.

Operation

Figure 1:
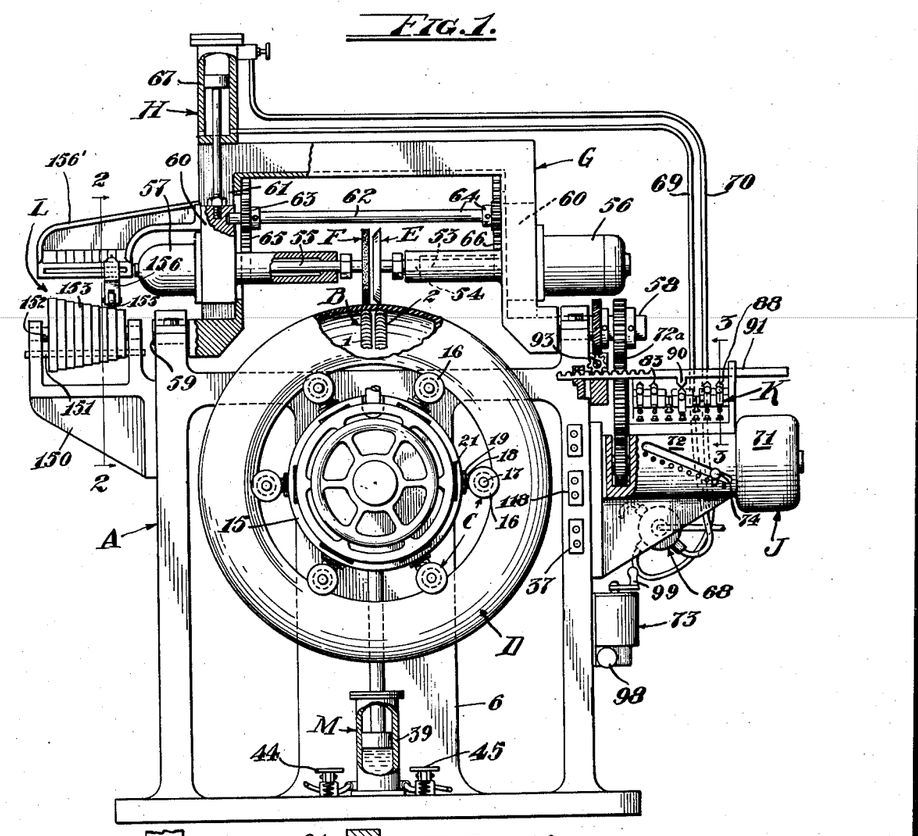
Fig. 1 is a front elevation of a machine constructed in accordance with this invention, parts being shown in section.
Figure 2:
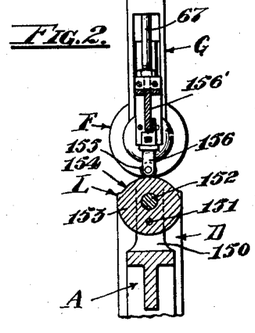
Fig. 2 is a sectional view taken on the plane of line 2—2 of Fig. 1.
Figures 17, 18, 19, 20, 21:
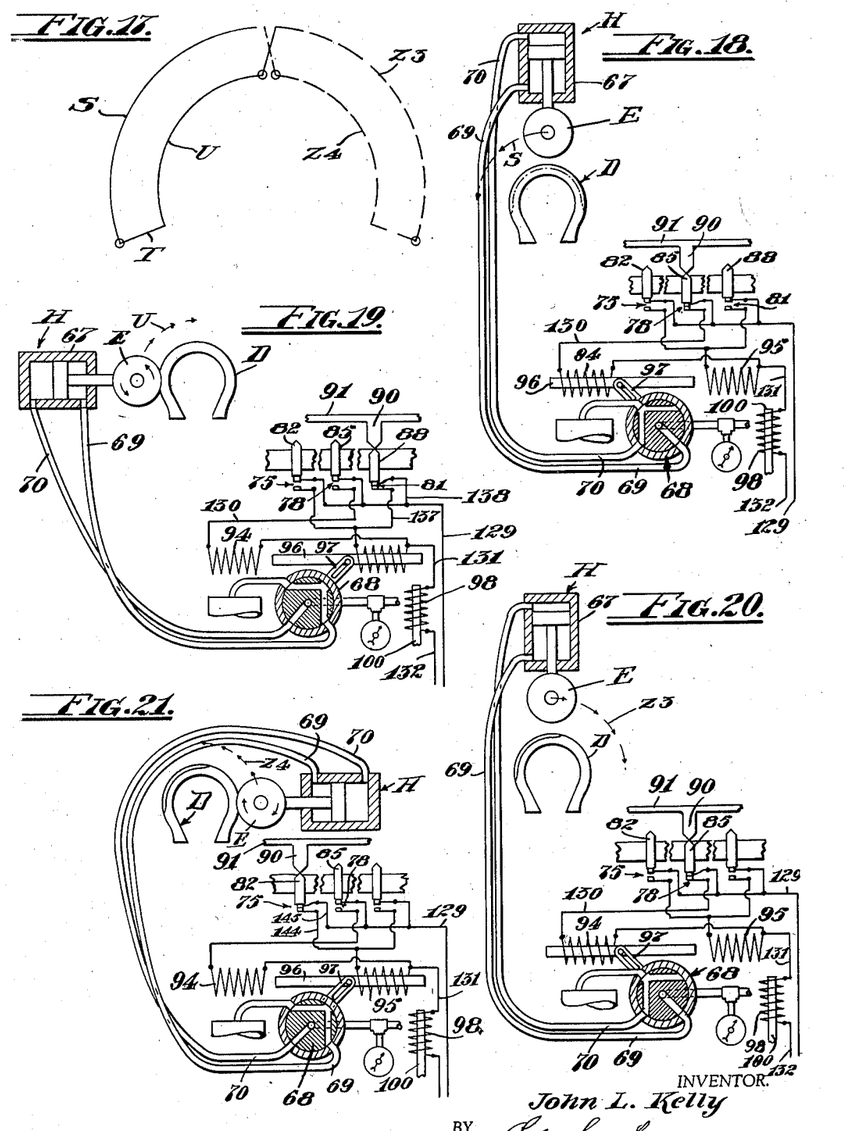
Fig. 17 is a diagram showing the paths of movement traversed by the cutter relative to the tire when a given detreading operation of the machine is carried out.
Fig. 18 is a diagram showing the cutter and control means and electrical circuit for the latter when the machine is in normal or starting position and the control is set for effecting the removal of the tread and both side walls of a tire, the extent of the cut to be made being indicated by dotted lines in the showing of the tire.
Fig. 19 is a view similar to Fig. 18 but showing the positions of the cutter and control means as when beginning the first cutting operation.
Fig. 20 is a view similar to Figs. 18 and 19 showing the position of the cutter and control means as when having completed the first cutting operation and with the cutter returned to normal or Fig. 18 position, the extent of cut made on this first operation being indicated in the showing of the tire wherein one side wall and half of the tread has been removed.
Fig. 21 is a view similar to Figs. 18, 19 and 20, showing the positions of the cutter and control means as when the cutter is starting its second and final operation for removing the remaining half of the tread and the remaining side wall.

Assuming that a tire set up in the machine, as shown in Fig. 1, is to be detreaded to the extent of removing the tread and side walls to a predetermined depth, the roller 155 is placed on a template of the group shown in Fig. 1, such, for example, as the one shown in Fig. 11, of proper size for the particular tire. The operator now raises the actuators 82, 85 and 88 for circuit closers 75, 78 and 81 into up position, as shown in Fig. 18, and the cam trip member 90 will engage and depress the actuator 85 whereby to close the circuit closer 78. The operator next closes switches 37 and 118 in the order named and the tire rotating motor 27 starts the rotation of the tire, whereas circuit closer 78 (see Fig. 18) now causes the solenoids 94 and 98 to be energized through conductors 116, 129, 130, solenoid 94, conductor 131, solenoid 98, and conductor 132, to other line conductor 115. Solenoid 94 does not at this time move the armature 96 as the armature has been previously moved to position shown in Fig. 18. Valve 18 is now in position to direct operating fluid from a source not shown to the jack 67 so as to hold the cutter and rasp retracted.

Figures 22, 23, 24, 25:
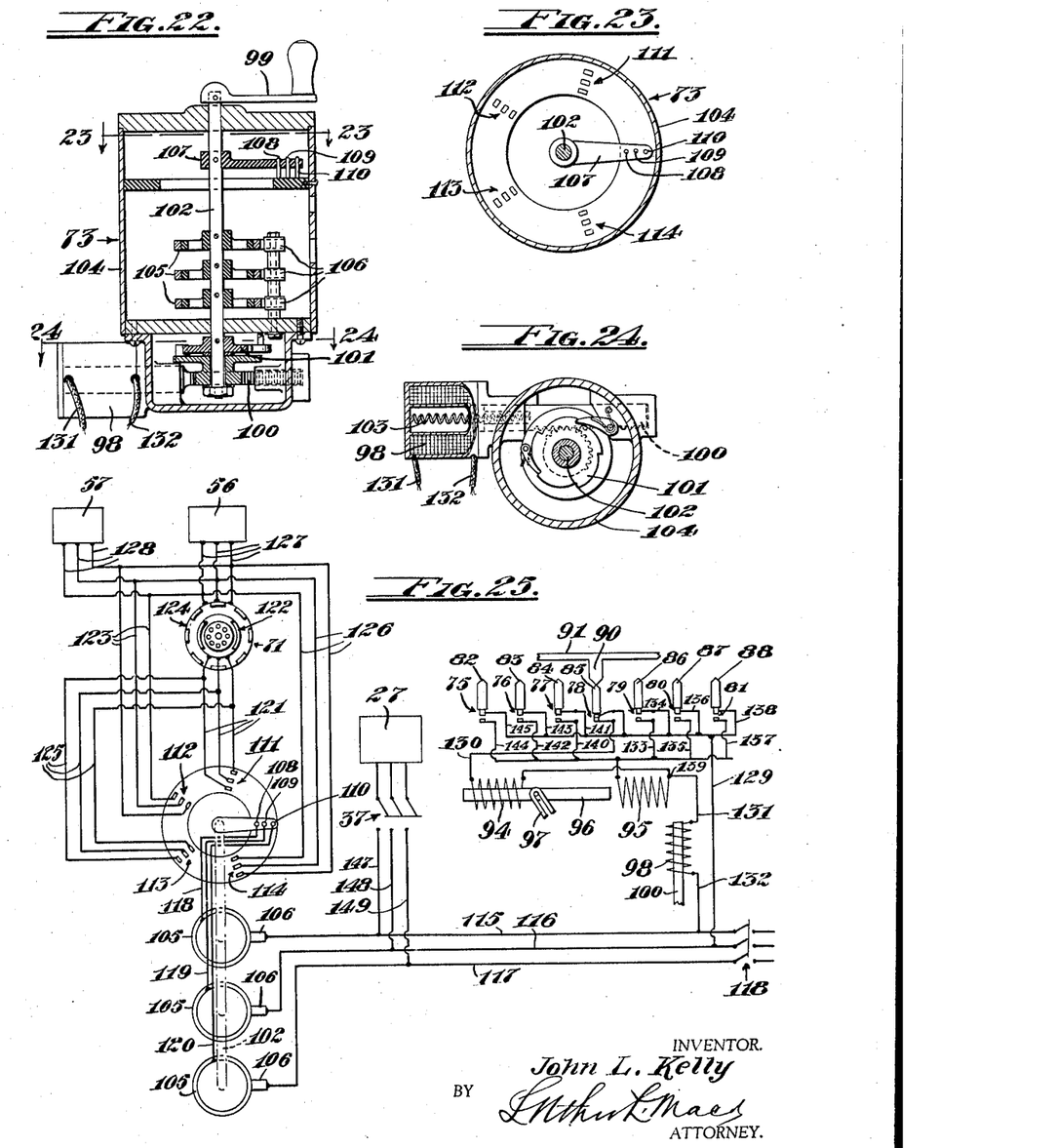
Fig. 22 is a sectional view of the automatic variable speed switch, showing the means for operating the same manually.
Fig. 23 is a sectional view taken on the plane of line 23—23 of Fig. 22.
Fig. 24 is a sectional view taken on the plane of line 24—24 of Fig. 22.
Fig. 25 is a diagram of the electrical circuits employed.

However, the solenoid 98 now operates through the ratchet drive 101 to rotate the shaft 102 of the switch device 67 whereby the contact arm 107 moves from its off position, as shown in Fig. 25, into position to cause contacts 108, 109 and 110 to engage contacts 112. This connects the high speed winding 122 of the motor and the latter operates, as previously described, through the transmission 72 and gear train 72a to swing the carriage G to the left of its upright position, whereby the cutter E and rasp F will describe the arc, as indicated by the line S in Fig. 17. As soon as the carriage G begins to move, the cam trip 90 is disengaged from the actuator 85 as said trip moves to the right of its position shown in Fig. 18, and circuit closer 79 immediately opens whereby the solenoids 94 and 98 become deenergized. The spring 103 now retracts the rack bar 100 relative to the ratchet drive means 101 and the switch 73 is thus made ready for its next operation.

When the carriage G reaches the limit of its swing to the left, the rack bar 91 will have moved to the right of its position shown in Fig. 18 to the position shown in Fig. 19, and the cam trip 90 will engage and depress the actuator 88 and thereby close the switch 81. This closes the circuit for the solenoids 95 and 98 through the circuit previously described. Solenoid 95 now moves the armature 96 to the position shown in Fig. 19 and the valve 68 is thereby moved to its Fig. 19 position whereby to direct the operating fluid through pipe 70 to the outer end of the hydraulic jack 67, which then functions to move the shoes 60 inwardly, whereby the cutter E and rasp F carried thereby are applied to the tire at a point opposite the anvil B. The line T in Fig. 17 indicates the path of movement followed by the cutter and rasp on application thereof to the tire. At the same time, the solenoid 98 operates to again rotate the switch shaft 102 so that the switch arm 107 is moved to engage contacts 108, 109 and 110 with contacts 112. This energizes the slow speed winding 124 of the main motor from the switch 73 through conductors 123, whereas through conductors 127 and 128 the circuits for motors 56 and 57 for the cutter and rasp are closed. Thus, the main motor and cutter and rasp motors are now simultaneously operated and the first cutting or detreading operation commences.

It should be noted that the winding 124 of the main motor will cause the motor to rotate in the opposite direction compared to its operation with the high speed winding. Thus the carriage G will be swung from left to right, and with the rasp and cutter will follow the path indicated by the line U in Fig. 17, at a slower rate than when moved through path S. This moves the rotating cutter and rasp transversely of the tire while the latter is driven by the motor 27, and one side wall and half of the tread will be cut away, as indicated in Fig. 20.

It should be noted that when the cutter engages the tire at the beginning of the first cutting operation, as shown in Fig. 19, it is desirable to have the tire rotate through one complete revolution before the transverse movement of the cutter is commenced, as otherwise an uneven cut would be made instead of the circumferentially uniform cut. Such a uniform cut is shown at X in Fig. 5 wherein the successive cuts are indicated by the dotted lines Z, these lines indicating the progressive cutting action.

In order to substantially hold the cutter E from moving until the tire is rotated through at least one revolution, as aforesaid, the operator manipulates the handle 74 of the transmission means 72 so as to reduce the rate of movement of the carriage G to such extent that an appreciable bodily movement of the cutter will not take place until the tire has made one or more complete revolutions past said cutter. After this the transmission means is restored to the normal condition for effecting a predetermined rate of transverse movement of the cutter relative to the rotation rate of the tire. These ratios may be varied as desired through use of the variable speed transmission 72.

As the cutter E removes the outer covering of the tire, the rasp F following behind the cutter produces the desired roughening of the remaining surface, as is desirable in this art. Thus when, for example, the cutter and rasp have traversed the first cutting movement, as indicated by the line U in Fig. 17, a predetermined amount of rubber will have been removed from approximately one-half of the tire, and that portion is then in condition for retreading. Thus, it is seen that one complete side wall and one-half of the tire tread is cut away and rasped in one operation.

When the carriage G arrives in upright position, as when completing the first cutting operation, the trip 90 will have been moved back to engage actuator 85 and switch 78 is again closed. This closes the circuit for and energizes solenoids 94 and 98 and the armature 96 is moved from position shown in Fig. 19 to position shown in Fig. 20, whereby the valve 68 is adjusted, as shown in the latter figure. This causes operating fluid to pass through pipe 69 to inner end of the jack 67 and the shoes 60 and cutting and rasping tools supported thereby are lifted clear of the tire, as shown in Fig. 20. At the same time, the solenoid 98 again operates the shaft 102 so that the contacts 108, 109 and 110 will be moved to engage the contacts 113 whereby to shut off the motors 56 and 57 and to connect the high speed windings 122 with the switch and line conductors through conductors 125 and 121. This causes the carriage G to swing to the right, (see Fig. 4) so that the cutter and rasp follow the path indicated by the line $Z^3$ in Fig. 17. It should be noted that conductors 125 reverse the line connections to conductors 121 whereby the motor will operate in the reverse direction as when conductors 121 connect it with the line conductors.

When the cutter and rasp reach the position on the other side (right) of the tire, as shown corresponding to that shown in Fig. 19, the trip 90 will have moved to the left and have depressed the actuator 82 whereby the switch 73 is closed. This closes the circuit for the solenoids 95 and 98 and the armature 96 is moved to position shown in Fig. 19 whereby valve 68 will cause the jack 67 to move the cutter and rasp against the tire. At the same time, solenoid 98 operates the switch 73 so that the contacts 108, 109 and 110 will engage contacts 114. This causes the low speed winding 124 to be connected to line conductors through conductors 126 and the motors 56 and 57 for the cutter and rasp to be started, (conductors 127 and 128 connect motors 56 and 57). The conductors 126 reverse the application of line current to the motor winding 124 and consequently the motor swings the carriage G upward and the cutter and rasp move through the path shown by line $Z^4$ in Fig. 17 and thereby cut away and abrade the side wall and remaining tread portion to the extent shown by dotted lines in Fig. 18.

When the cutter and rasp reach the top of the stroke thereof, the trip 90 is again moved to depress the actuator 85 which closes switch 78, whereby solenoids 94 and 98 are energized. This causes valve 68 to operate so that the jack 67 will retract the cutter and rasp to position shown in Fig. 18. Furthermore, the solenoid 98 at this time operates the switch 73 so that the contacts 108, 109 and 110 are moved into the "off" position shown in Fig. 25, thereby shutting off the motors 56 and 57 for the cutter and rasp and also the main motor, and the operation is thus completed.

It will now be seen that with one continuous automatic operation, the machine of the inventor will remove the outer covering of a tire between bead portions thereof, whereby the tread and both side walls will be cut away to a predetermined depth and be thus quickly and effectively prepared for retreading, without requiring a manual guiding, gaging and other manual control during the detreading operation.

When it is desired to cut away the cap portion only of the tread of a tire, a template such as the one shown in Fig. 9 is used in the template means L, and the actuators 84, 85 and 86 are lifted to operative position, whereas the other actuators are left in inoperative position. The machine will follow the same cyclical operation as previously described, but the extent of transverse movement of the cutter and rasp is shortened so that the cutter is applied at one side of the "cap" portion then moved towards the center of the cap, then lifted, then moved to the other side of cap, then applied, then moved towards the center again, and finally lifted.

When making a full tread removal without cutting the side walls, the actuators 83, 85 and 87 only are set in operative position and the extent of transverse movement of the cutter and rasp is thus increased. The template shown in Fig. 10 is employed for the full tread cut and it is seen that the machine follows the same cyclical operation as when making the maximum detreading cut.

It is now seen that the extent of transverse movement made by the cutter and rasp relative to the tire determines the area of outer tire covering which may be removed in a given operation of the machine and that the several actuators 82 to 88 and their associated elements make possible a plurality of different automatic detreading operations covering substantially the entire field of tire preparation treatments practiced in the art of repairing and retreading tires.

I claim:

1. A machine for preparing tires for retreading, comprising tire-supporting means, means for rotating a tire around said means, a rotary cutter, means for rotating said cutter, means for moving said cutter back and forth in paths transversely of the tire, means for automatically moving the cutter into and out of tire engaging position when the cutter is disposed in different positions in said paths, and control means arranged to be selectively manually set to prescribe different transverse movements of said cutter and which operates automatically to produce predetermined movements of the cutter in said transverse paths and into and out of tire engaging position.

2. A machine for preparing tires for retreading, comprising an anvil adapted to engage interiorly of a tire, means for rotating a tire around and in engagement with said anvil, a rotary tire treating tool, means for rotating said tool, means for moving said tool in paths transversely of the tire, means for automatically moving said tool into and out of position of engagement with the outer surface of the tire at points opposite the anvil and when the tool is in different positions in said paths and control means for varying the extent of transverse movement of said tool and the points of application of the tool to said tire.

3. A machine for preparing tires for retreading, comprising an anvil adapted to engage interiorly of a tire, means for rotating a tire around and in engagement with said anvil, a rotary treating tool, means for rotating said tool, means for moving said tool in paths transversely of the tire, means for automatically moving said tool into and out of position of engagement with the outer surface of the tire at points opposite the anvil and when the tool is in different positions in said paths and control means for varying the extent of transverse movement of said tool and the points of application of the tool to said tire, and template means for controlling the application.

4. A machine for preparing tires for retreading, comprising a tire supporting means, means for rotating a tire around said means, a rotary detreading cutter, means for rotating said cutter, means for moving said cutter in paths transversely of the tire during rotation of the latter, means for moving the cutter into and out of detreading engagement with the outer surface of a tire during rotation of the latter and control means operable selectively for governing the movement of said cutter relative to said tire for selectively cutting away the cap portion of the tread, the entire tread portion and the tread and either or both side walls of the tire.

5. A machine for preparing tires for retreading, comprising a tire support, means for rotating a tire around said support, a tire detreading tool, means for moving said tool transversely of the tire, means for moving said tool into and out of engagement with said tire and means controlling the movement of said tool for selectively cutting away the tread cap, the entire tread and the tread and one or both side walls.

6. A machine for preparing tires for retreading, comprising means for rotating a tire about a fixed axis, a tire detreading tool, means for reciprocally moving said tool transversely of the outer side of a tire substantially from one bead portion of the tire to the other, means for rotating said tool, means for moving said tool into and out of contact with the tire during said transverse movement and means which is manually selectively set to predetermine the movement of said tool before the machine is set in operation, and control means operating to automatically effect a selected movement of the tool when the machine is set into operation.

7. A machine for preparing tires for retreading, comprising a frame, means on said frame for rotating a tire around a fixed axis, a stationary anvil adapted to engage the interior of the tire, a rotary detreading cutter movable in a transverse path relative to the tire at a point opposite said anvil, means for rotating said cutter, a tire abrading tool movable with said cutter, means for rotating said abrading tool, means for moving said cutter and tool into and out of contact with the tire and control means selectively operable for varying the extent of transverse movement of the cutter and the tool and the points of application thereof to the tire.

8. A machine for preparing tires for retreading, comprising a frame, means for rotating a tire around a fixed axis on said frame, an oscillatory carriage on the frame, a rotary detreading cutter mounted on the carriage for movement into and out of contact with the tire and for movement transversely of the tire upon oscillation of said carriage, means for oscillating said carriage and means for automatically moving said cutter into and out of tire engaging position when the cutter is in different positions relative to said tire.

9. A machine for preparing tires for retreading, comprising a frame, means for rotating a tire around a fixed axis on said frame, an oscillatory carriage on the frame, a rotary detreading cutter mounted on the carriage for movement into and out of contact with the tire and for movement transversely of the tire upon oscillation of said carriage, means for oscillating said carriage and means for automatically moving said cutter into and out of tire engaging position when the cutter is in different positions relative to said tire, a tire abrading tool mounted on said carriage for movement therewith corresponding to that of said cutter and adapted to be engaged and disengaged simultaneously with the cutter, and means for rotating said abrading tool.

10. A machine for preparing tires for retreading, comprising a frame, means for rotating a tire around a fixed axis on said frame, an oscillatory carriage on the frame, a rotary detreading cutter mounted on the carriage for movement into and out of contact with the tire and for movement transversely of the tire upon oscillation of said carriage, means for oscillating said carriage and means for automatically moving said cutter into and out of tire engaging position when the cutter is in different positions relative to said tire, and a stationary anvil engaging the interior of a tire at a point opposite said cutter.

11. A machine for preparing tires for retreading, comprising a frame, means for rotating a tire around a fixed axis on said frame, an oscillatory carriage on the frame, a rotary detreading cutter mounted on the carriage for movement into and out of contact with the tire and for movement transversely of the tire upon oscillation of said carriage, means for oscillating said carriage and means for automatically moving said cutter into and out of tire engaging position when the cutter is in different positions relative to said tire, and template means for controlling the application of said cutter to said tire.

12. A machine for preparing tires for retreading, comprising a frame, means for rotating a tire around a fixed axis on said frame, an oscillatory carriage on the frame, means for oscillating said carriage, means for varying the extent of movement of said carriage in either direction, a tire treating tool mounted on said carriage for movement therewith in a path transversely of the tire and into and out of contact with the tire, means automatically moving said tool into and out of contact with the tire when the tool is disposed in different positions relative to said tire.

13. A machine for preparing tires for retreading, comprising a frame, means for rotating a tire around a fixed axis on said frame, an oscillatory carriage on the frame, means for oscillating said carriage, means for varying the extent of movement of said carriage in either direction, a tire treating tool mounted on said carriage for movement therewith in a path transversely of the tire and into and out of contact with the tire, and a template associated with said carriage and frame for controlling the application of said tool to said tire.

14. A machine for preparing tires for retreading, comprising a frame, means for rotating a tire around a fixed axis on said frame, an oscillatory carriage on the frame, means for oscillating said carriage, means for varying the extent of movement of said carriage in either direction, a tire treating tool mounted on said carriage for movement therewith in a path transversely of the tire and into and out of contact with the tire, means automatically moving said tool into and out of contact with the tire when the tool is disposed in different positions relative to said tire, and means for automatically varying the speed of transverse movement of said tool.

15. A machine for preparing tires for retreading, comprising a frame, means on the frame for rotating a tire around a fixed axis, a detreading tool movable transversely of and into and out of engagement with said tire and means operating automatically for moving said tool into an operative engagement with the tire at a point spaced transversely from the peripheral center line of the tire, then moving the tool approximately to said center line, then removing the tool from contact with the tire and repeating this operation on the other side of said center line.

16. A machine for preparing tires for retreading, comprising a frame, means on the frame for rotating a tire around a fixed axis, a detreading tool movable transversely of and into and out of engagement with said tire and means operating automatically for moving said tool into an operative engagement with the tire at a point spaced transversely from the peripheral center line of the tire, then moving the tool approximately to said center line, then removing the tool from contact with the tire and repeating this operation on the other side of said center line, and means for varying the extent of transverse movement of said tool while engaged with said tire.

17. A machine of the character described, including means for rotating a tire around a fixed axis, an anvil adapted for engagement with the interior of the tire, a stationary support for said anvil, and rollers mounted on said support for contact with the beads only of said tire whereby the tire is in close engagement with said anvil while permitting free rotation of said tire around said anvil.

18. A machine of the character described, including means for rotating a tire around a fixed axis, an anvil adapted for engagement with the interior of the tire, a stationary support for said anvil, tire bead engaging rollers mounted on said support for engaging the tire beads without contacting the side walls of the tire, for holding the tire in close engagement with said anvil while permitting free rotation of said tire around said anvil, and means for adjusting said rollers laterally into and out of position to hold the tire against said anvil.

19. A machine of the character described, including means for rotating a tire around a fixed axis, an anvil adapted for engagement with the interior of the tire, a stationary support for said anvil, tire bead engaging rollers mounted on said support for holding the tire in close engagement with said anvil, and means for adjusting said rollers into and out of position to hold the tire against said anvil, said anvil comprising arcuate members fixed to said support and anti-friction rollers mounted on said arcuate members for engagement with the interior surface of the tire.

20. A machine of the character described, including means for rotating a tire around a fixed axis, an anvil adapted for engagement with the interior of the tire, a stationary support for said anvil, tire bead engaging rollers mounted on said support for holding the tire in close engagement with said anvil, and means for adjusting said rollers into and out of position to hold the tire against said anvil, said anvil comprising arcuate members fixed to said support and anti-friction rollers mounted on said arcuate members for engagement with the interior surface of the tire, said bead engaging rollers being disposed for engagement with the inner and outer sides of the bead portions of the tire.

21. A machine for preparing tires for retreading, comprising a frame, means on the frame for rotating a tire, a tire treating tool movable transversely of and into and out of engagement with said tire and means operating automatically for moving said tool into an operative engagement with the tire at a point spaced transversely from the peripheral center line of the tire, then moving the tool approximately to said center line, then removing the tool from contact with the tire and repeating this operation on the other side of said center line, and means for varying the extent of transverse movement of said tool while engaged with said tire.

22. A machine for preparing tires for retreading, comprising a frame, means for rotating a tire, a carriage on the frame, a tire treating tool mounted on the carriage for movement into and out of contact with the tire and for movement relative to the tire when said carriage is moved, means for moving said carriage and means for automatically moving said tool into and out of tire engaging position when the tool is disposed in different positions relative to the tire.

JOHN L. KELLY.